(12) United States Patent
Doi et al.

(10) Patent No.: US 11,017,817 B2
(45) Date of Patent: May 25, 2021

(54) IMAGE PROCESSING APPARATUS, IMAGE PROCESSING METHOD, CAMERA APPARATUS, REMOTE CONTROL APPARATUS, AND CAMERA SYSTEM

(71) Applicant: SONY CORPORATION, Tokyo (JP)

(72) Inventors: Satoshi Doi, Tokyo (JP); Hiroyuki Nagai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/491,730

(22) PCT Filed: Mar. 19, 2018

(86) PCT No.: PCT/JP2018/010686
§ 371 (c)(1),
(2) Date: Sep. 6, 2019

(87) PCT Pub. No.: WO2018/180656
PCT Pub. Date: Oct. 4, 2018

(65) Prior Publication Data
US 2020/0013432 A1    Jan. 9, 2020

(30) Foreign Application Priority Data
Mar. 27, 2017 (JP) .................................. 2017-060405

(51) Int. Cl.
*G11B 27/30* (2006.01)
*H04N 5/232* (2006.01)
(Continued)

(52) U.S. Cl.
CPC ................ *G11B 27/3036* (2013.01)

(58) Field of Classification Search
USPC ......... 386/223–224, 230, 239–248, 278–290
See application file for complete search history.

(56) References Cited

U.S. PATENT DOCUMENTS

| | | | | |
|---|---|---|---|---|
| 6,317,795 B1 * | 11/2001 | Malkin | ................... | H04N 7/162 709/246 |
| 8,713,191 B1 * | 4/2014 | Hallock | ................ | H04M 19/04 709/231 |

(Continued)

FOREIGN PATENT DOCUMENTS

| | | |
|---|---|---|
| JP | 2001-216726 A | 8/2001 |
| JP | 2006-033506 A | 2/2006 |

OTHER PUBLICATIONS

International Search Report and Written Opinion of PCT Application No. PCT/JP2018/010686, dated Jun. 5, 2018, 08 pages of ISRWO.

*Primary Examiner* — Hung Q Dang
(74) *Attorney, Agent, or Firm* — Chip Law Group (57) ABSTRACT

The present invention enables correct placement of an electronic mark on a frame of captured image data intended by a remote control apparatus performing monitoring. Monitoring image data with a time code is transmitted to an external device. A command (an electronic mark placement command, or the like) to which a time code value showing a command target frame in the monitoring image data is added is received from the remote control apparatus. Processing based on the command is performed on a frame corresponding to the time code value added to the command, among image data corresponding to the monitoring image data recorded on a recording medium.

13 Claims, 8 Drawing Sheets

(51) Int. Cl.
*H04N 5/77* (2006.01)
*H04N 5/92* (2006.01)
*H04N 7/18* (2006.01)

(56) References Cited

U.S. PATENT DOCUMENTS

| | | | |
|---|---|---|---|
| 2013/0003621 A1* | 1/2013 | Huang | G06F 3/041 |
| | | | 370/310 |
| 2013/0129308 A1* | 5/2013 | Karn | H04N 5/783 |
| | | | 386/230 |
| 2016/0182838 A1* | 6/2016 | Gredegard | H04N 5/23296 |
| | | | 348/240.3 |
| 2016/0217300 A1* | 7/2016 | Kim | G06F 21/6245 |
| 2016/0307597 A1* | 10/2016 | Koide | G11B 27/10 |
| 2018/0013958 A1* | 1/2018 | Nakata | H04N 7/183 |

\* cited by examiner

IMAGE PROCESSING APPARATUS, IMAGE PROCESSING METHOD, CAMERA APPARATUS, REMOTE CONTROL APPARATUS, AND CAMERA SYSTEM

CROSS REFERENCE TO RELATED APPLICATIONS

This application is a U.S. National Phase of International Patent Application No. PCT/JP2018/010686 filed on Mar. 19, 2018, which claims priority benefit of Japanese Patent Application No. JP 2017-060405 filed in the Japan Patent Office on Mar. 27, 2017. Each of the above-referenced applications is hereby incorporated herein by reference in its entirety.

TECHNICAL FIELD

The present technology relates to an image processing apparatus, an image processing method, a camera apparatus, a remote control apparatus, and a camera system, and more particularly to an image processing apparatus, and the like that performs processing based on a command received from an external device.

BACKGROUND ART

It is conventionally known to place an electronic mark on captured image data recorded on a recording medium of a camera apparatus by an operation from a remote control apparatus that is connected to the camera apparatus via a wireless network such as Wi-Fi and capable of monitoring captured image contents (see, for example, Patent Document 1).

In this case, the remote control apparatus simply transmits an electronic mark placement command to the camera apparatus, and the camera apparatus places an electronic mark on the captured image data at timing when receiving the command. Therefore, a frame on which the electronic mark is placed in the captured image data recorded on the recording medium sometimes deviates from a frame intended by the remote control apparatus due to a network delay.

Furthermore, with specifications allowing an electronic mark to be placed only on current captured image data, in a case where placing an electronic mark is forgotten, it is not possible to rewind the captured image data and place an electronic mark during image-capturing, and a process to place an electronic mark is required again after image-capturing.

Furthermore, conventionally, in order to cut out and transfer a necessary part in a clip recorded on the recording medium of the camera apparatus, a recorded clip (a proxy) is transferred to a remote control apparatus, for example, a personal computer, and an in point (a cut-out start position) and an out point (a cut-out end position) is designated by the remote control apparatus. Therefore, this work has not been able to be performed during image-capturing.

CITATION LIST

Patent Document

Patent Document 1: Japanese Patent Application Laid-Open No. 2001-216726

SUMMARY OF THE INVENTION

Problems to be Solved by the Invention

It is an object of the present technology to allow an electronic mark to be placed correctly on a frame of image data intended by a remote control apparatus performing monitoring. Furthermore, it is an object of the present technology to allow an electronic mark to be placed retroactively even in a case where placing of an electronic mark on current image data is failed. Furthermore, it is an object of the present technology to enable a cut-out and transfer operation by the remote control apparatus performing monitoring during image-capturing.

Solutions to Problems

A concept of the present technology lies in
an image processing apparatus including:
a transmission unit that transmits, to an external device, monitoring image data with a time code;
a reception unit that receives, from the external device, a command to which a time code value showing a command target frame in the monitoring image data is added; and
a processing unit that performs processing based on the command on a frame that corresponds to the time code value added to the command, among image data corresponding to the monitoring image data recorded on a recording medium.

In the present technology, the transmission unit transmits monitoring image data with a time code to the external device (for example, a remote control apparatus). With this arrangement, in the external device, an image can be monitored, and a command target frame for performing processing based on a command can be specified by a time code value.

The reception unit receives, from the external device, the command to which the time code value showing the command target frame is added. The processing unit performs the processing based on the command on the frame corresponding to the time code value added to the command, among the image data corresponding to the monitoring image data recorded on the recording medium.

For example, the reception unit may receive an electronic mark placement command to which a time code value showing a frame on which an electronic mark is to be placed is added, and the processing unit may place an electronic mark on a frame that has a time code value matching the time code value showing the frame on which an electronic mark is to be placed, among the image data recorded on the recording medium. In this case, since the time code value showing the frame on which the electronic mark is to be placed is added to the electronic mark placement command, the electronic mark can be placed correctly on a frame intended by the external device even if the electronic mark placement command is received late due to a network delay.

Furthermore, for example, the reception unit may receive a cut-out and transfer command to which first and second time code values respectively showing in-point and out-point frames of a cut-out range are added, and the processing unit may cut out and transfer image data that is in the cut-out range specified by the in-point and out-point frames respectively having time code values matching the first and second time code values, among the image data recorded on the recording medium.

Furthermore, for example, an image-capturing unit, an image-capturing signal processing unit that obtains image data by processing an image-capturing signal obtained by the image-capturing unit, and a recording unit that records on the recording medium the image data obtained by processing the image-capturing signal, with a time code attached to the image data, may be further included, and the monitoring image data may be generated on the basis of the image data obtained by processing the image-capturing signal. In this case, in the external device, an image currently being captured can be monitored, and a command for performing processing on the image data obtained by processing the image-capturing signal (the electronic mark placement command, the cut-out and transfer command, or the like) is issued.

Furthermore, for example, a reproduction unit that reproduces the image data recorded on the recording medium may be further included, and the monitoring image data may be generated on the basis of the reproduced image data. In this case, in the external device, a past recorded image can be monitored, and a command for performing processing on the recorded image data (the electronic mark placement command, the cut-out and transfer command, or the like) is issued.

Furthermore, another concept of the present technology lies in an image processing apparatus including:

a reception unit that receives, from an external device, monitoring image data with a time code;

a receive buffer that temporarily stores the received monitoring image data;

an image display unit that displays an image by the monitoring image data reproduced from the receive buffer;

a setting unit that sets an optional frame in image data stored in the receive buffer as a command target frame; and a transmission unit that transmits, to the external device, a command to which a time code value showing the set command target frame is added.

In the present technology, the reception unit receives monitoring image data with a time code from the external device (for example, a camera apparatus). The monitoring image data is temporarily stored in the receive buffer. The image display unit displays an image by the monitoring image data reproduced from the receive buffer. This allows a user to monitor an image.

The setting unit sets the optional frame in the image data stored in the receive buffer as the command target frame. For example, the setting unit may set a frame of the monitoring image data being reproduced from the receive buffer as the command target frame when a frame designation operation is performed by a user. In this case, the user can perform the frame designation operation with an understanding that an image currently being monitored is an image of the frame to be set as the command target frame.

In this case, for example, a reproduction position control unit that controls, on the basis of a position designated on a timeline showing a time period of the image data stored in the receive buffer, a reproduction position of the monitoring image data from the receive buffer may be further included. This allows a reproduction position to be moved back to a past position and an electronic mark to be placed retroactively even in a case where placing of an electronic mark is failed.

For example, in a case of an electronic mark placement command, a frame on which an electronic mark is to be placed is set as a command target frame. Furthermore, for example, in a case of a cut-out and transfer command, two frames, one is a frame of an in point (a cut-out start position) and the other is a frame of an out point (a cut-out end position) of a cut-out range, are set as command target frames.

The transmission unit transmits, to the external device, the command to which the time code value showing the set command target frame is added. For example, the transmission unit may transmit an electronic mark placement command to which a time code value showing a frame on which an electronic mark is to be placed is added. In this case, since the time code value showing the frame on which the electronic mark is to be placed is added to the electronic mark placement command, in the external device, the electronic mark can be placed correctly on an intended frame even if the electronic mark placement command is received late due to a network delay.

Furthermore, for example, the transmission unit may transmit the cut-out and transfer command to which first and second time code values respectively showing the in-point and the out-point frames of the cut-out range are added. In a case where the monitoring image data received from the external device is generated on the basis of captured image data, a cut-out and transfer operation can be performed during image-capturing.

Effects of the Invention

According to the present technology, an electronic mark can be placed correctly on a frame of image data intended by a remote control apparatus performing monitoring. Furthermore, according to the present technology, an electronic mark can be placed retroactively even in a case where placing of an electronic mark on current image data is failed. Furthermore, according to the present technology, a cut-out and transfer operation can be performed, during image-capturing, by the remote control apparatus performing monitoring. Note that effects described herein are merely illustrative and are not intended to be restrictive, and there may be additional effects.

MODE FOR CARRYING OUT THE INVENTION

Hereinafter, a mode for carrying out the invention (hereinafter referred to as "embodiment") will be described. Note that the description will be given in order shown below.
1. Embodiment
2. Modified example

1. Embodiment

[Configuration Example of Camera System]

Figure 1:
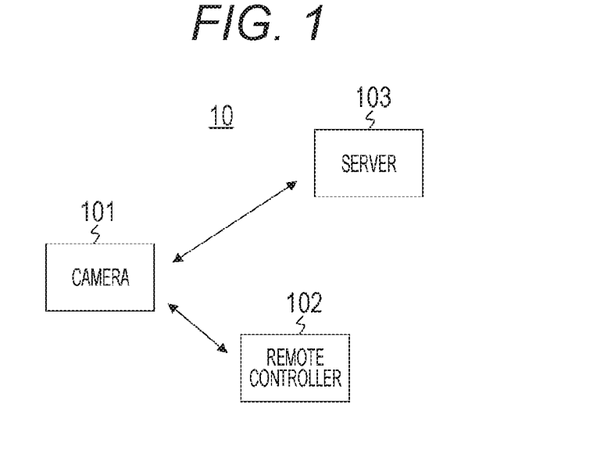
FIG. 1 is a block diagram illustrating a configuration example of a camera system as an embodiment.

FIG. 1 illustrates a configuration example of a camera system 10 as an embodiment. The camera system 10 has a camera 101, a remote control apparatus (hereinafter, appropriately referred to as a "remote controller") 102, and a server 103.

The camera 101 captures an image of a subject to obtain image data, and records, on a recording medium such as a memory card, the image data with a time code attached to the image data. A series of image data from start to end of recording are recorded as a piece of clip data (a clip). In the recording medium, the image data is converted to a file, one for each clip, and managed by a file system.

Metadata is added to the image data recorded on the recording medium. The metadata includes frame metadata added for each frame and clip metadata added for each clip. The frame metadata is data corresponding to a frame, and is data where real-time performance is required when the image data is reproduced or the like. The frame metadata includes a time code, a user bit, a unique material identifier (UMID), GPS information, and camera setting/control information.

The clip metadata is data corresponding to a clip as a whole, and is data where real-time performance is not required when the image data is reproduced or the like. The clip metadata includes a conversion table in which a time code corresponding to each frame is associated with a frame number, a UMID, and GPS information.

Furthermore, the camera 101 generates monitoring image data on the basis of the image data obtained by image-capturing, attaches a time code to the monitoring image data as with the original image data, and sends the monitoring image data to the remote controller 102 via a network, for example, a wireless network such as Wi-Fi. The monitoring image data is reduced in size with respect to the original image data to lower a transfer bit rate.

The remote controller 102 includes terminal equipment, for example, a tablet, a personal computer, and a smartphone. The remote controller 102 temporarily stores the monitoring image data sent from the camera. The receive buffer has a recording capacity for a specific time. The remote controller 102 reproduces the monitoring image data from the receive buffer, and displays, on a display unit, an image by the reproduced monitoring image data. Note that the display unit is not necessarily integrated into the remote controller 102, and the display unit may have an independent structure.

In accordance with an operation of a user (an operator of the remote controller), the remote controller 102 can control a reproduction position of the monitoring image data reproduced from the receive buffer. That is, not only the latest monitoring image data can be reproduced from the receive buffer, but also image data can be reproduced retroactively. For example, together with the reproduced image, a timeline showing a time period of the monitoring image data stored in the receive buffer is displayed on the remote controller 102, and a user designates the position on the timeline.

When a user performs an electronic mark placement operation, the remote controller 102 produces an electronic mark placement command and sends the electronic mark placement command to the camera 101 via a wireless network. A time code value showing a command target frame (a time code value showing a frame on which an electronic mark is to be placed) is added to the electronic mark placement command. In this case, when the electronic mark placement operation is performed, the remote controller 102 sets a frame of the monitoring image data being reproduced from the receive buffer as the command target frame.

In this way, the time code value showing the command target frame is added to the electronic mark placement command, and therefore, in the camera 101, the electronic mark can be placed correctly on a frame intended by the remote controller 102 even if the electronic mark placement command is received late due to a network delay.

Furthermore, the frame of the monitoring image data being reproduced from the receive buffer is set as the command target frame, and therefore a user can perform a frame designation operation with an understanding that an image currently being displayed (an image being monitored) is an image of a frame to be set as the command target frame.

As described above, a user can set the reproduction position of the monitoring image data reproduced from the receive buffer not to the latest position but to a position retroactive to the past by an optional period of time (its maximum time depends on a capacity of the receive buffer). This allows a user to place an electronic mark retroactively even in a case where placing of an electronic mark is failed.

On the basis of the electronic mark placement command sent from the remote controller 102, the camera 101 places an electronic mark on a frame that has a time code value matching the added time code value, among the image data recorded on the recording medium. The electronic mark is contained in the frame metadata added for each frame as described above.

Furthermore, the remote controller produces a cut-out and transfer command in accordance with a user's operation and sends the cut-out and transfer command to the camera 101 via a wireless network. Time code values showing command target frames (first and second time code values respectively showing in-point and out-point frames of a cut-out range) are added to the cut-out and transfer command. In this case, just as in a case of the electronic mark placement command described above, the remote controller 102 sets a frame of the monitoring image data being reproduced from the receive buffer as a command target frame when the user performs the frame designation operation.

As described above, a user can set the reproduction position of the monitoring image data reproduced from the receive buffer not to the latest position but to a position retroactive to the past by an optional period of time (its maximum time depends on a capacity of the receive buffer). This allows a user to retroactively designate both in-point and out-point frames or only an in-point frame of a cut-out range.

In this way, the remote controller 102 can send the cut-out and transfer command to the camera 101. This allows a cut-out and transfer operation to be performed during image-capturing in a case where the monitoring image data sent from the camera 101 is obtained by processing an image-capturing signal as described above.

On the basis of the cut-out and transfer command sent from the remote controller 102, the camera 101 cuts out image data in the cut-out range specified by the in-point and out-point frames respectively having time code values matching the added first and second time code values, among the image data recorded on the recording medium, and transfers the cut-out image data to the server 103 via a wireless network such as Wi-Fi. Note that the camera 101 transfers, to the server 103, not only the image data in the cut-out range but also optional clip data recorded on the recording medium, as needed.

The above description is based on the assumption that the camera 101 is capturing an image. That is, monitoring image data generated on the basis of image data obtained by processing an image-capturing signal is sent from the camera 101 to the remote controller 102. However, in the camera 101, it is also possible to reproduce image data from the recording medium, send monitoring image data obtained by processing the image data to the remote controller 102, and produce, by the remote controller 102, the command to control the camera 101, as described above.

[Configuration Example of Camera]

Figure 2:
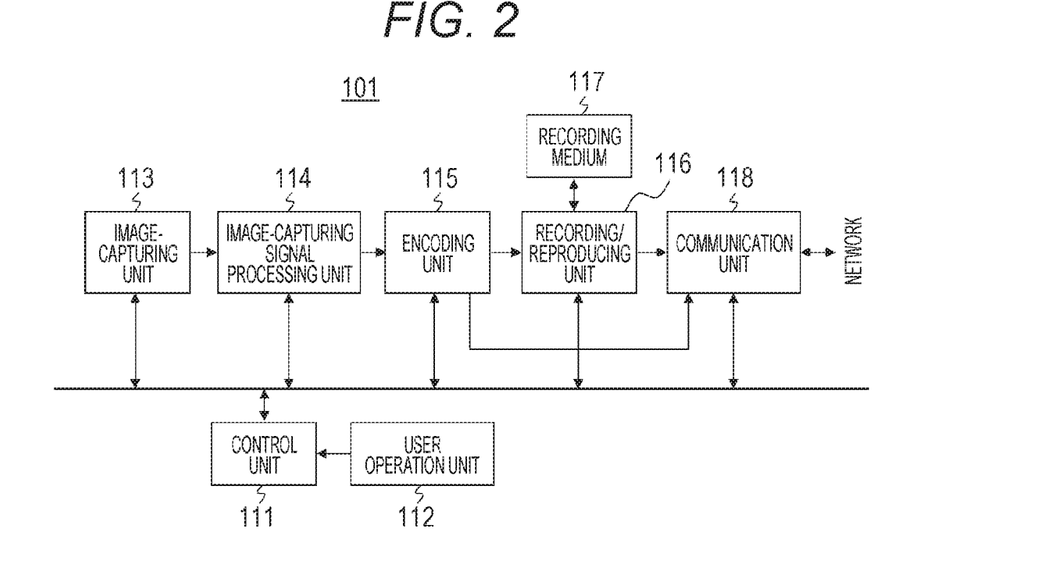
FIG. 2 is a block diagram illustrating a configuration example of a camera.

FIG. 2 illustrates a configuration example of the camera 101. The camera 101 has a control unit 111, a user operation unit 112, an image-capturing unit 113, an image-capturing signal processing unit 114, an encoding unit 115, a recording/reproducing unit 116, a recording medium 117, and a communication unit 118.

The control unit 111 controls behavior of each unit of the camera 101. The user operation unit 112 is connected with the control unit 111 and constitutes a user interface that accepts various operations by a user.

The image-capturing unit 113 has an image-capturing lens and an image-capturing element (an imager) that are not illustrated. The image-capturing unit 113 captures an image of a subject and outputs an image-capturing signal. The image-capturing element is an image-capturing element such as a charged coupled device (CCD) or a complementary metal-oxide semiconductor (CMOS). The image-capturing signal processing unit 114 generates captured image data by performing, on an image-capturing signal (an analog signal) output from the image-capturing unit 113, sample and hold control, gain control, conversion from the analog signal to a digital signal, and furthermore, white balance adjustment, gamma correction, and the like.

The encoding unit 115 generates encoded image data by performing, on the captured image data generated by the image-capturing signal processing unit 114, data compression processing using, for example, an MPEG method. Furthermore, the encoding unit 115 generates monitoring image data on the basis of the captured image data. The monitoring image data is reduced in size with respect to the captured image data to lower a transfer bit rate.

The recording/reproducing unit 116 records, on the recording medium 117, the encoded image data obtained by the encoding unit 115, with a time code attached to the encoded image data. Furthermore, the recording/reproducing unit 116 reproduces the encoded image data from the recording medium 117 as needed. The recording medium 117 includes a memory card or the like. Here, a series of image data from start to end of recording are recorded as a piece of clip data (a clip). In the recording medium, the image data is converted to a file, one for each clip, and managed by a file system.

When an image is captured, the communication unit 118 sends, to the remote controller 102 via a wireless network such as Wi-Fi, the monitoring image data obtained by the encoding unit 115, with a time code attached to the monitoring image data. Furthermore, when the encoded image data is reproduced from the recording medium 117, the encoded image data is processed to generate monitoring image data (encoded image data), and the monitoring image data is sent to the remote controller 102 via a wireless network such as Wi-Fi, with a time code attached to the monitoring image data. Furthermore, the communication unit 118 communicates with the server 103 to send, to the server 103, the clip data reproduced from the recording medium 117.

Furthermore, the communication unit 118 receives a command from the remote controller 102 and sends the command to the control unit 111. The control unit 111 controls behavior of each unit in accordance with the command. In a case where an electronic mark placement command to which a time code value of a command target frame (a time code value showing a frame on which an electronic mark is to be placed) is added is received, the recording/reproducing unit 116, under control of the control unit 111, places an electronic mark on a frame that has a time code value matching the added time code value, among the image data recorded on the recording medium 117.

Furthermore, in a case where a cut-out and transfer command to which time code values showing command target frames (first and second time code values respectively showing in-point and out-point frames of a cut-out range) are added is received, the recording/reproducing unit 116, under control of the control unit 111, reproduces image data in the cut-out range specified by the in-point and out-point frames respectively having time code values matching the added first and second time code values, among the image data recorded on the recording medium. Then, the communication unit 118 transfers, to the server 103, the reproduced image data in the cut-out range.

[Configuration Example of Remote Control Apparatus]

Figure 3:
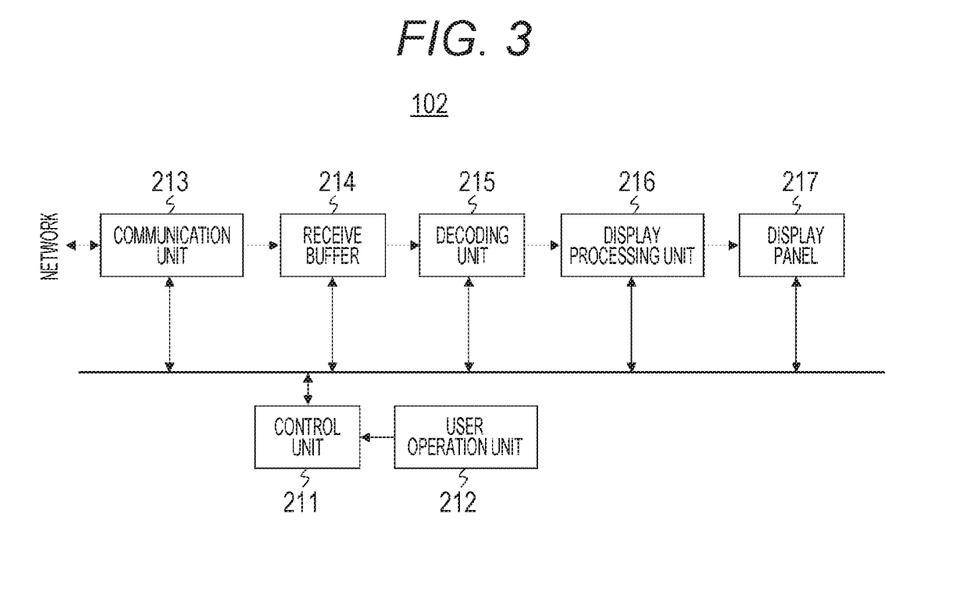
FIG. 3 is a block diagram illustrating a configuration example of a remote control apparatus.

FIG. 3 illustrates a configuration example of the remote controller (remote control apparatus) 102. The remote controller 102 has a control unit 211, a user operation unit 212, a communication unit 213, a receive buffer 214, a decoding unit 215, a display processing unit 216, and a display panel 217.

The control unit 211 controls behavior of each unit of the remote controller 102. The user operation unit 212 is connected with the control unit 211 and constitutes a user interface that accepts various operations by a user. The user operation unit 212 includes, for example, a mechanical operation button and, furthermore, and a touch panel and the like arranged on a screen of the display panel 217.

The communication unit 213 communicates with the camera 101 to receive monitoring image data from the camera 101 and also transmit a command (an electronic mark placement command, a cut-out and transfer command, or the like) to the camera 101, via a wireless network. A time code is attached to the monitoring image data as described above. The receive buffer 214 temporarily stores the monitoring image data received by the communication unit 213. The receive buffer 214 has a recording capacity for a specific time.

The decoding unit 215, under control of the control unit 211, reproduces the monitoring image data (encoded data) from the receive buffer 214, and performs decoding processing to obtain display image data. Furthermore, the decoding unit 215 extracts a time code (a time code value)

of each frame of the monitoring image data sequentially reproduced from the receive buffer 214, and sends the time code to the control unit 211.

The display processing unit 216, under control of the control unit 211, generates display image data for a screen to be displayed on the display panel 217 in accordance with image data obtained by the decoding unit 215 and, furthermore, a user's operation from the user operation unit 212, and the like.

Figure 4:
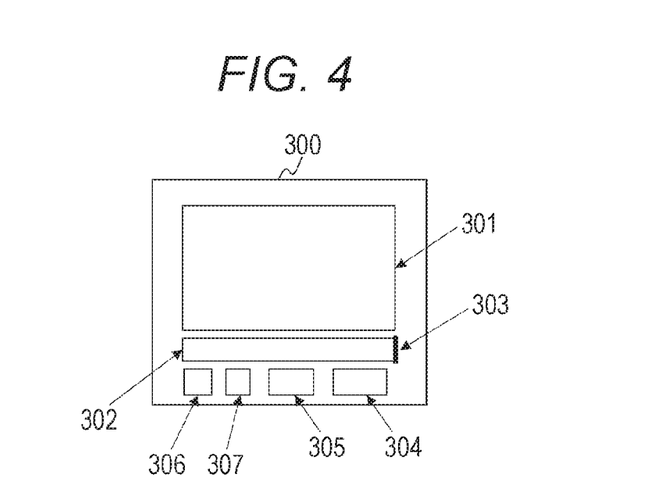
FIG. 4 is a diagram illustrating an example of a screen (a UI screen) to be displayed on a display panel.

FIG. 4 illustrates an example of a screen (a UI screen) 300 to be displayed on the display panel 217. On the screen 300, there is an image display area 301 where an image by the monitoring image data is displayed. Furthermore, on the screen 300, a timeline 302 showing a time period of the monitoring image data stored in the receive buffer 214 is displayed. A right edge of the timeline 302 indicates the latest position, and the more the position is on the left, the older the position is.

On the timeline 302, a pointer 303 is displayed to show a reproduction position. The pointer 303 can be moved to an optional position on the timeline 302 in accordance with a user's operation. In the illustrated example, the pointer 303 is at the right edge of the timeline 302. This shows that the latest monitoring image data is being reproduced from the receive buffer 214.

Furthermore, on the screen 300, an electronic mark button 304, a cut-out and transfer button 305, an in-point button 306, and an out-point button 307 are displayed. The electronic mark button 304 is a button a user operates to place an electronic mark.

When the electronic mark button 304 is operated, the control unit 211 produces an electronic mark placement command, and the communication unit 213 sends the electronic mark placement command to the camera 101 via a wireless network.

A time code value showing a frame on which an electronic mark is to be placed is added to the electronic mark placement command. When the electronic mark button 304 is operated, the control unit 211 sets a frame of the monitoring image data being reproduced from the receive buffer 214 as a frame on which an electronic mark is to be placed, and adds the time code value of the frame to the electronic mark placement command.

Figure 5A:
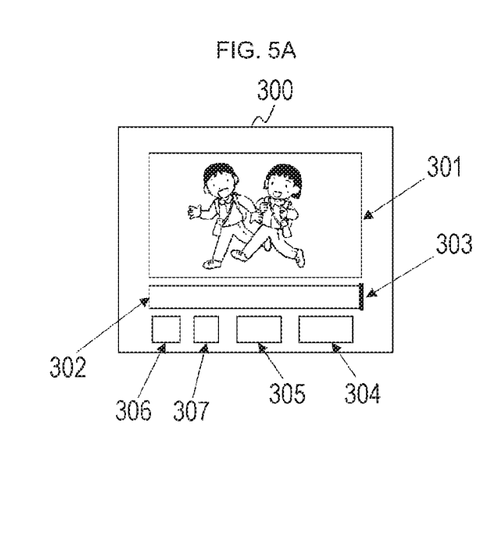
FIGS. 5A and 5B are diagrams for describing user's operations concerning production of an electronic mark placement command.
Figure 5B:
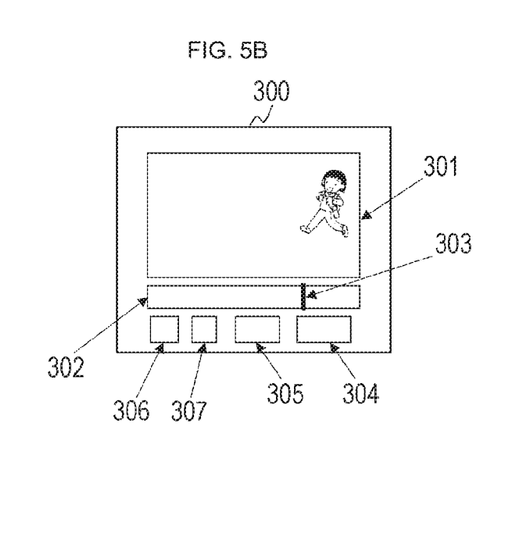

In this case, as described above, a user can change the reproduction position by moving the pointer 303 that shows the reproduction position on the timeline 302. FIG. 5A illustrates a state where the pointer 303 is at the right edge of the timeline and the latest monitoring image data is being reproduced from the receive buffer 214. FIG. 5B illustrates a state where the pointer 303 is moved slightly leftward, instead of being at the right edge of the timeline, and monitoring image data retroactive to the past by a certain time is being reproduced from the receive buffer 214. This allows a user to place an electronic mark retroactively even in a case where placing of an electronic mark is failed.

Furthermore, when the cut-out and transfer button 305 is operated after in-point (cut-out start position) and out-point (cut-out end position) frames of a cut-out range are set, the control unit 211 produces a cut-out and transfer command, and the communication unit 213 sends the cut-out and transfer command to the camera 101 via a wireless network. The first and second time code values respectively showing the in-point and out-point frames of the cut-out range are added to the cut-out and transfer command.

Figure 6A:
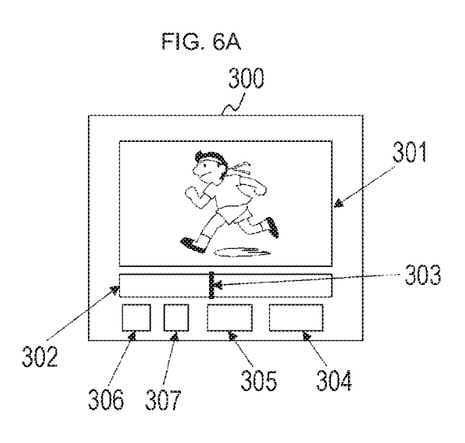
FIGS. 6A and 6B are diagrams for describing user's operations concerning production of a cut-out and transfer command.

To set an in point, a user operates the in-point button 306. In this case, when the in-point button 306 is operated, the control unit 211 sets a frame of the monitoring image data being reproduced from the receive buffer 214 as an in-point frame, and sets a time code value of the frame to a first time code value. FIG. 6A illustrates an example of a state where the in point is set. In this state, the pointer 303 is moved slightly leftward, instead of being at the right edge of the timeline, and monitoring image data retroactive to the past by a certain time is being reproduced from the receive buffer 214.

To set an out point, a user operates the out-point button 307. In this case, when the out-point button 307 is operated, the control unit 211 sets a frame of the monitoring image data being reproduced from the receive buffer 214 as an out-point frame, and sets a time code value of the frame to a second time code value.

Figure 6B:
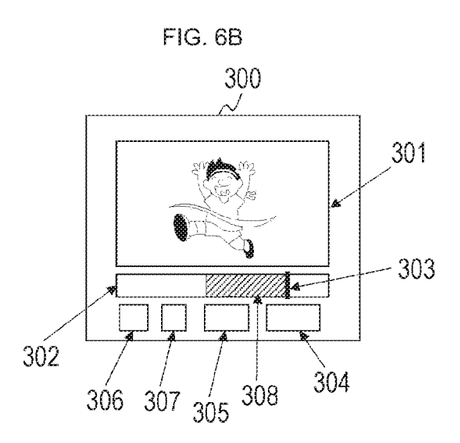

FIG. 6B illustrates an example of a state where an out point is set. In this state, the pointer 303 is moved rightward from the state where the in point is set, and monitoring image data at the reproduction position is being reproduced from the receive buffer 214. In this case, in the timeline 302, a cut-out range 308 is shown by, for example, a change in color, pattern, or the like. Note that the display of the cut-out range 308 disappears after, for example, the cut-out and transfer button 304 is operated to send a cut-out and transfer command to the camera 101.

Figure 7:
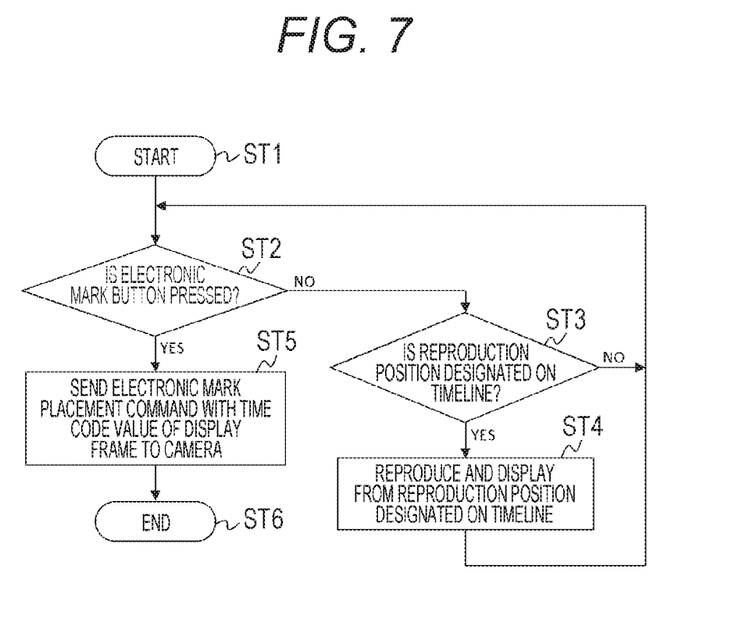
FIG. 7 is a flowchart illustrating an example of control processing concerning transmission of an electronic mark placement command in a control unit of the remote control apparatus.

The flowchart in FIG. 7 illustrates an example of control processing concerning transmission of an electronic mark placement command in the control unit 211 of the remote controller 102. In step ST1, the control unit 211 starts the processing. Thereafter, in step ST2, the control unit 211 determines whether or not the electronic mark button 304 is pressed.

When it is determined that the electronic mark button 304 is not pressed, in step ST3, the control unit 211 determines whether or not the reproduction position is designated (changed) on the timeline 302. In this case, when a moving operation of the pointer 303 is performed, the control unit 211 determines that the reproduction position is designated. If it is determined that the reproduction position is not designated, the control unit 211 returns to processing of step ST2.

On the other hand, when it is determined that the reproduction position is designated, in order that reproduction may be started in step ST4 from the reproduction position designated on the timeline 302, the control unit 211 controls reproduction of monitoring image data from the receive buffer 214 and displays an image by the image data in the image display area 301 on the screen 300. After processing of step ST4, the control unit 211 returns to processing of step ST2.

When it is determined in step ST2 that the electronic mark button 304 is pressed, in step ST5, the control unit 211 adds, to an electronic mark placement command, a time code value of a display frame, i.e., a frame of the monitoring image data being reproduced from the receive buffer 214, and sends the electronic mark placement command from the communication unit 213 to the camera 101. After processing of step ST5, in step ST6, the control unit 211 ends a series of the control processing.

Figure 8:
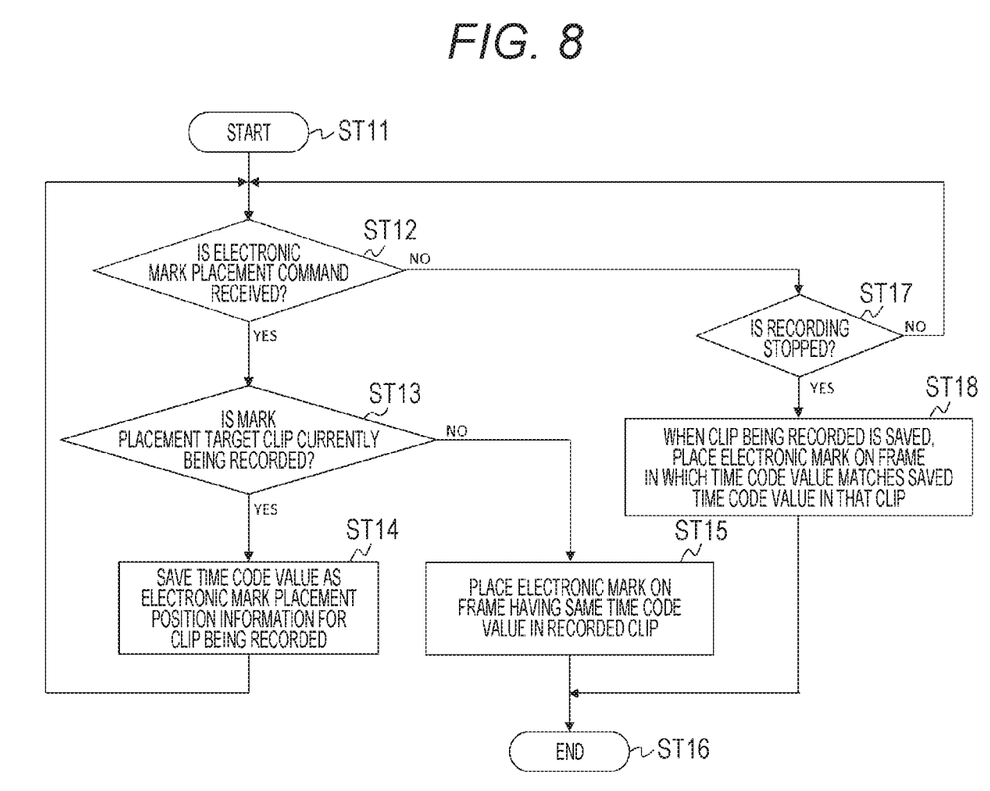
FIG. 8 is a flowchart illustrating an example of control processing concerning reception of an electronic mark placement command in a control unit of the camera.

The flowchart in FIG. 8 illustrates an example of control processing concerning reception of an electronic mark placement command in the control unit 111 of the camera 101. In step ST11, the control unit 111 starts the processing. Thereafter, in step ST12, the control unit 111 determines whether or not the electronic mark placement command is received by the communication unit 118.

When it is determined that the electronic mark placement command is received, in step ST13, the control unit 111 determines whether or not a mark placement target is a clip currently being recorded, on the basis of a time code value added to the command. When it is determined that the mark placement target is the clip currently being recorded, in step ST14, the control unit 111 saves the time code value added to the electronic mark placement command as information regarding an electronic mark placement position on the clip being recorded. After processing of step ST14, the control unit 111 returns to processing of step ST12.

On the other hand, when it is determined in step ST13 that the mark placement target is not the clip currently being recorded, in step ST15, the control unit 111 controls the recording/reproducing unit 116 to place an electronic mark on a frame having the same time code value in a recorded clip. That is, an electronic mark is included in frame metadata of the frame. After processing of step ST15, in step ST16, the control unit 111 ends a series of the control processing.

When it is determined in step ST12 that the electronic mark placement command is not received, in step ST17, the control unit 111 determines whether or not recording is stopped. When it is determined that recording is not stopped, the control unit 111 returns to the processing of step ST12.

On the other hand, when it is determined that recording is stopped, in step ST18, at the time of saving the clip being recorded, the control unit 111 controls the recording/reproducing unit 116 to place an electronic mark on a frame in which a time code value matches the saved time code value in that clip. That is, an electronic mark is included in frame metadata of the frame. After processing of step ST18, in step ST16, the control unit 111 ends a series of the control processing.

Figure 9:
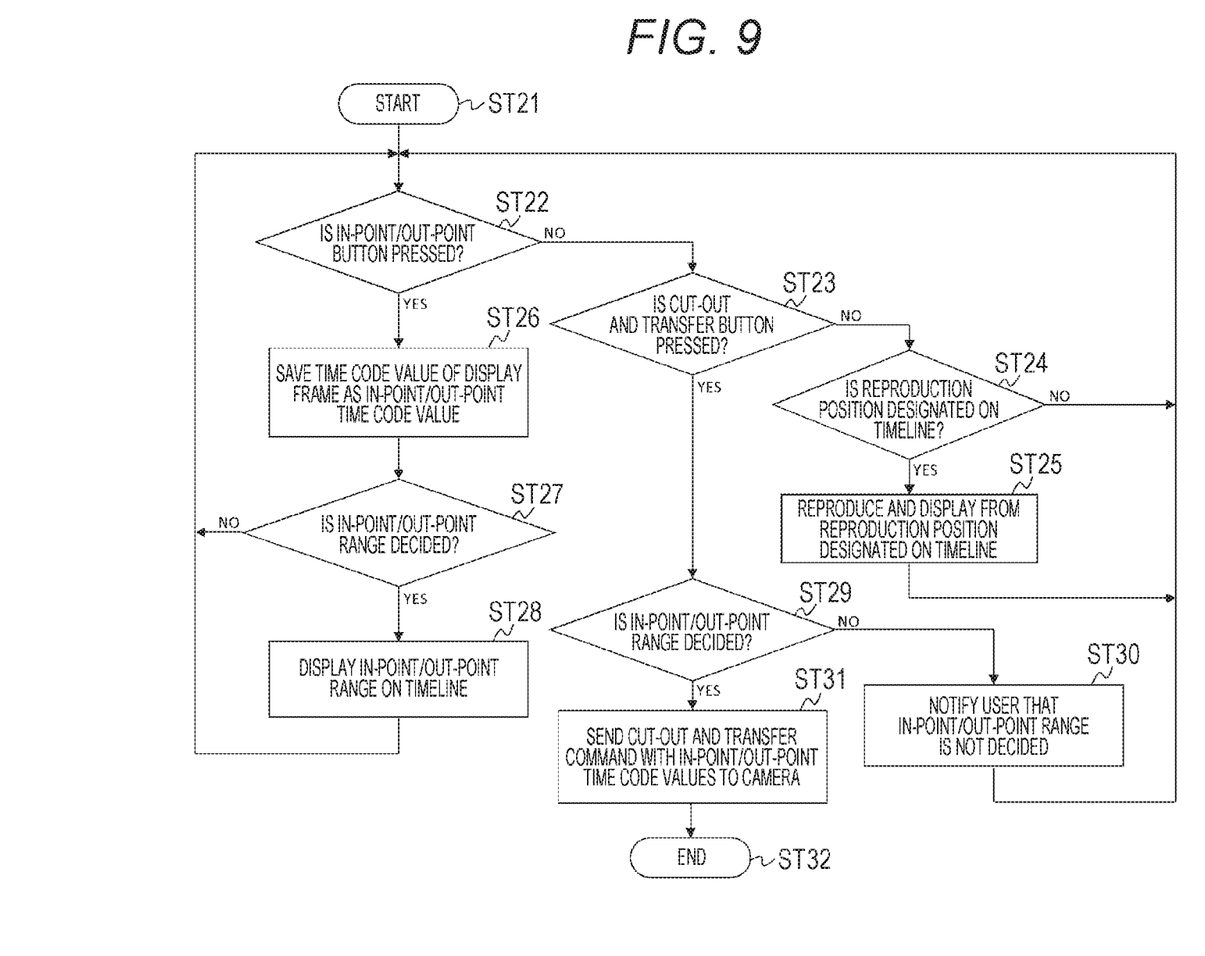
FIG. 9 is a flowchart illustrating an example of control processing concerning transmission of a cut-out and transfer command in the control unit of the remote controller.

The flowchart in FIG. 9 illustrates an example of control processing concerning transmission of a cut-out and transfer command in the control unit 211 of the remote controller 102. In step ST21, the control unit 211 starts the processing. Thereafter, in step ST22, the control unit 211 determines whether or not the in-point button 306 or the out-point button 307 is pressed.

When it is determined that the buttons is not pressed, in step ST23, the control unit 211 determines whether or not the cut-out and transfer button 305 is pressed. When it is determined that the cut-out and transfer button is not pressed, in step ST24, the control unit 211 determines whether or not the reproduction position is designated (changed) on the timeline 302. In this case, when a moving operation of the pointer 303 is performed, the control unit 211 determines that the reproduction position is designated. When it is determined that the reproduction position is not designated, the control unit 211 returns to processing of step ST22.

On the other hand, when it is determined that the reproduction position is designated, in order that reproduction may be started in step ST25 from the reproduction position designated on the timeline 302, the control unit 211 controls reproduction of monitoring image data from the receive buffer 214 and displays an image by the image data in the image display area 301 on the screen 300. After processing of step ST25, the control unit 211 returns to processing of step ST22.

When it is determined in step ST22 that the in-point button 306 or the out-point button 307 is pressed, in step ST26, the control unit 211 saves each time code value of a display frame, i.e., a frame of the monitoring image data being reproduced from the receive buffer 214, as a time code value of the in point (cut-out start position) or the out point (cut-out end position).

After processing of step ST26, the control unit 211 proceeds to processing of step ST27. In the step ST27, the control unit 211 determines whether or not a cut-out range is decided by designating an in point and an out point. When it is determined that the cut-out range is not decided, the control unit 211 returns to processing of step ST22.

On the other hand, when it is determined that the cut-out range is decided, in step ST28, the control unit 211 controls the display processing unit 216 to display the cut-out range 308 on the timeline 302. After processing of step ST28, the control unit 211 returns to processing of step ST22.

When it is determined in step ST23 that the cut-out and transfer button 305 is pressed, in step ST29, the control unit 211 determines whether or not the cut-out range is decided by designating the in point and the out point. When it is determined that the cut-out range is not decided, the control unit 211 controls the display processing unit 216 to display and notify a user in step ST30 that the cut-out range is not decided by designating the in point and the out point. After processing of step ST30, the control unit 211 returns to processing of step ST22.

On the other hand, when it is determined in step ST29 that the cut-out range is decided, in step ST31, the control unit 211 adds time code values of the in point and the out point to a cut-out and transfer command, and sends the cut-out and transfer command from the communication unit 213 to the camera 101. After processing of step ST31, in step ST32, the control unit 211 ends a series of the control processing.

Figure 10:
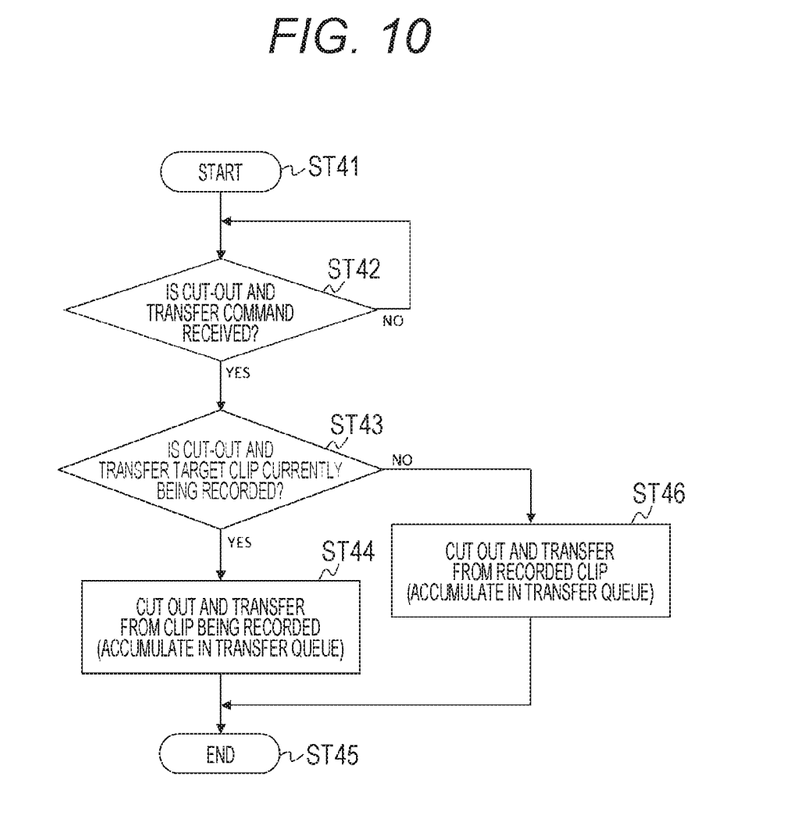
FIG. 10 is a flowchart illustrating an example of control processing concerning reception of a cut-out and transfer command in the control unit of the camera.

The flowchart in FIG. 10 illustrates an example of control processing concerning reception of a cut-out and transfer command in the control unit 111 of the camera 101. In step ST41, the control unit 111 starts the processing. Thereafter, in step ST42, the control unit 111 determines whether or not a cut-out and transfer command is received by the communication unit 118.

When it is determined that the cut-out and transfer command is received, in step ST43, the control unit 111 determines whether or not a cut-out and transfer target is a clip currently being recorded, on the basis of a time code value added to the command. When it is determined that the cut-out and transfer target is the clip currently being recorded, in step ST44, the control unit 111 controls the recording/reproducing unit 116 to extract image data in a cut-out range from the clip being recorded and transfer the image data from the communication unit 118 to the server 103. In this case, since the transfer may take time in some cases, cut-out and transfer requests are accumulated in a transfer queue and processed sequentially. After processing of step ST44, in step ST45, the control unit 111 ends a series of the control processing.

On the other hand, when it is determined in step ST43 that the cut-out and transfer target is not the clip currently being recorded, in step ST46, the control unit 111 controls the recording/reproducing unit 116 to extract image data in a cut-out range from a recorded clip and transfer the image data from the communication unit 118 to the server 103. In this case, since the transfer may take time in some cases, cut-out and transfer requests are accumulated in a transfer queue and processed sequentially. After processing of step ST44, in step ST45, the control unit 111 ends a series of the control processing.

As described above, in the camera system 10 illustrated in FIG. 1, a time code value showing a frame on which an electronic mark is to be placed is added to an electronic mark placement command that is sent from the remote controller 102 to the camera 101. Therefore, in the camera 101, the electronic mark can be placed correctly by the remote apparatus 102 on a frame intended by a user (the operator of the remote controller) even if the electronic mark placement command is received late due to a network delay.

Furthermore, in the camera system 10 illustrated in FIG. 1, the remote controller 102 sets a frame of monitoring image data being reproduced from the receive buffer 214 as a command target frame when a user performs a frame designation operation. Therefore, a user (an operator of the remote controller) can perform a frame designation operation with an understanding that an image currently being monitored is an image of a frame to be set as a command target frame.

Furthermore, in the camera system 10 illustrated in FIG. 1, on the basis of a position designated on the timeline 302 showing a time period of image data stored in the receive buffer 214, the remote controller 102 can control a reproduction position of monitoring image data from the receive buffer 214. Therefore, the reproduction position can be moved back to a past position, and an electronic mark can be placed retroactively even in a case where placing of an electronic mark is failed.

Furthermore, in the camera system 10 illustrated in FIG. 1, on the basis of monitoring image data with time codes sent from the camera 101, the remote controller 102 issues and transmits, to the camera 101, a cut-out and transfer command to which time code values designating and showing in-point and out-point frames of a cut-out range are added. Therefore, in a case where the monitoring image data from the camera 101 is generated on the basis of captured image data, a cut-out and transfer operation can be performed during image-capturing. This allows image data being captured to be quickly sent to the server 103 for purposes such as news flash.

2. Modified Example

Note that while the embodiment described above shows an example of the remote controller 102 where the electronic mark placement button 304, the cut-out and transfer button 305, the in-point button 306, and the out-point button 307 are displayed on the screen 300, any or all of these buttons may be physical buttons.

Furthermore, the present technology may also have the following configurations.

(1) An image processing apparatus including:
a transmission unit that transmits, to an external device, monitoring image data with a time code;
a reception unit that receives, from the external device, a command to which a time code value showing a command target frame is added; and
a processing unit that performs processing based on the command on a frame corresponding to the time code value added to the command, among image data corresponding to the monitoring image data recorded on a recording medium.

(2) The image processing apparatus according to (1), further including:
an image-capturing unit;
an image-capturing signal processing unit that obtains image data by processing an image-capturing signal obtained by the image-capturing unit; and
a recording unit that records on the recording medium the image data obtained by processing the image-capturing signal, with a time code attached to the image data,
in which the monitoring image data is generated on the basis of the image data obtained by processing the image-capturing signal.

(3) The image processing apparatus according to (1), further including:
a reproduction unit that reproduces the image data recorded on the recording medium,
in which the monitoring image data is generated on the basis of the reproduced image data.

(4) The image processing apparatus according to any one of (1) to (3), in which
the reception unit receives an electronic mark placement command to which a time code value showing a frame on which an electronic mark is to be placed is added, and
the processing unit places the electronic mark on a frame that has a time code value matching the time code value showing the frame on which an electronic mark is to be placed, among the image data recorded on the recording medium.

(5) The image processing apparatus according to any one of (1) to (4), in which
the reception unit receives a cut-out and transfer command to which first and second time code values respectively showing in-point and out-point frames of a cut-out range are added, and
the processing unit cuts out and transfers image data in the cut-out range specified by the in-point and out-point frames respectively having time code values matching the first and second time code values, among the image data recorded on the recording medium.

(6) An image processing method including the steps of:
transmitting, by a transmission unit, monitoring image data with a time code to an external device;
receiving, by a reception unit, from the external device, a command to which a time code value showing a command target frame is added; and
performing, by a processing unit, processing based on the command on a frame corresponding to the time code value added to the command, among image data corresponding to the monitoring image data recorded on a recording medium.

(7) An image processing apparatus including:
a reception unit that receives, from an external device, monitoring image data with a time code;
a receive buffer that temporarily stores the received monitoring image data;
an image display unit that displays an image by the monitoring image data reproduced from the receive buffer;
a setting unit that sets an optional frame in image data stored in the receive buffer as a command target frame; and
a transmission unit that transmits, to the external device, a command to which a time code value showing the set command target frame is added.

(8) The image processing apparatus according to (7), in which
the setting unit sets a frame of the monitoring image data being reproduced from the receive buffer as the command target frame when a frame designation operation is performed by a user.

(9) The image processing apparatus according to (8), further including:
a reproduction position control unit that controls, on the basis of a position designated on a timeline showing a time period of the image data stored in the receive buffer, a reproduction position of the monitoring image data from the receive buffer.

(10) The image processing apparatus according to any one of (7) to (9), in which
the transmission unit transmits an electronic mark placement command to which a time code value showing a frame on which an electronic mark is to be placed is added.

(11) The image processing apparatus according to any one of (7) to (10), in which the transmission unit transmits a cut-out and transfer command to which first and second time code values respectively showing in-point and out-point frames of a cut-out range are added.

(12) An image processing method including the steps of:

receiving, by a reception unit, monitoring image data with a time code from an external device;

displaying, by an image display unit, an image by the monitoring image data reproduced from a receive buffer that temporarily stores the received monitoring image data;

setting an optional frame in image data stored in the receive buffer as a command target frame; and transmitting, by a transmission unit, to the external device, a command to which a time code value showing the set command target frame is added.

(13) A camera apparatus including:

an image-capturing unit;

an image-capturing signal processing unit that obtains image data by processing an image-capturing signal obtained by the image-capturing unit;

a recording unit that records on a recording medium the image data obtained by processing the image-capturing signal, with a time code attached to the image data;

a transmission unit that transmits, to a remote control apparatus, monitoring image data with a time code, the monitoring image data being generated on the basis of the image data obtained by processing the image-capturing signal;

a reception unit that receives, from the remote control apparatus, a command to which a time code value showing a command target frame in the monitoring image data is added; and a processing unit that performs processing based on the command on a frame corresponding to the time code value added to the command, among image data corresponding to the monitoring image data recorded on the recording medium.

(14) A remote control apparatus including:

a reception unit that receives, from a camera apparatus, monitoring image data with a time code;

a receive buffer that temporarily stores the received monitoring image data;

an image display unit that displays an image by the monitoring image data reproduced from the receive buffer;

a setting unit that sets an optional frame in image data stored in the receive buffer as a command target frame; and a transmission unit that transmits, to the camera apparatus, a command to which a time code value showing the set command target frame is added.

(15) A camera system including a camera apparatus and a remote control apparatus connected with the camera apparatus via a wireless network, in which the camera apparatus includes:

an image-capturing unit;

an image-capturing signal processing unit that obtains image data by processing an image-capturing signal obtained by the image-capturing unit;

a recording unit that records on a recording medium the image data obtained by processing the image-capturing signal, with a time code attached to the image data;

a transmission unit that transmits, to the remote control apparatus, monitoring image data with a time code, the monitoring image data being generated on the basis of the image data obtained by processing the image-capturing signal;

a reception unit that receives, from the remote control apparatus, a command to which a time code value showing a command target frame in the monitoring image data is added; and a processing unit that performs processing based on the command on a frame corresponding to the time code value added to the command, among image data corresponding to the monitoring image data recorded on the recording medium, and the remote control apparatus includes:

a reception unit that receives, from the camera apparatus, the monitoring image data with the time code;

a receive buffer that temporarily stores the received monitoring image data;

an image display unit that displays an image by the monitoring image data reproduced from the receive buffer;

a setting unit that sets an optional frame in image data stored in the receive buffer as the command target frame; and a transmission unit that transmits, to the camera apparatus, the command to which the time code value showing the set command target frame is added.

REFERENCE SIGNS LIST

10 Camera system
101 Camera
102 Remote control apparatus
103 Server
111 Control unit
112 User operation unit
113 Image-capturing unit
114 Image-capturing signal processing unit
115 Encoding unit
116 Recording/reproducing unit
117 Recording medium
118 Communication unit
211 Control unit
212 User operation unit
213 Communication unit
214 Receive buffer
215 Decoding unit
216 Display processing unit
217 Display panel
300 Screen
301 Image display area
302 Timeline
303 Pointer
304 Electronic mark button
305 Cut-out and transfer button
306 In-point button
307 Out-point button

The invention claimed is:

1. An image processing apparatus, comprising:

a transmission unit configured to transmit, to an external device, monitoring image data with a time code, wherein the monitoring image data corresponds to first image data recorded on a recording medium;

a reception unit configured to receive, from the external device, an electronic mark placement command including a specific time code value, wherein the specific time code value indicates a target frame on which an electronic mark is to be placed; and a processing unit configured to:
determine the target frame is in one of a currently recorded clip or in a previously recorded clip, based on the specific time code value;

store the specific time code value as information associated with an electronic mark placement position on the currently recorded clip, wherein the specific time code value is stored based on the determination that the target frame is in the currently recorded clip; and add the electronic mark on the target frame, indicated by the specific time code value, based on the determination that the target frame is in the previously recorded clip, wherein the recorded first image data corresponding to the monitoring image data includes the previously recorded clip.

2. The image processing apparatus according to claim 1, further comprising:

an image-capturing unit configured to obtain an image-capturing signal; and an image-capturing signal processing unit configured to process the image-capturing signal to obtain the first image data, wherein the specific time code attached to the first image data is recorded on the recording medium.

3. The image processing apparatus according to claim 1, further comprising a reproduction unit configured to reproduce the first image data recorded on the recording medium, wherein the monitoring image data is generated based on the reproduced first image data.

4. The image processing apparatus according to claim 1, wherein the reception unit is further configured to receive a cut-out and transfer command including a first time code value that indicates an in-point frame of a cut-out range and a second time code value that indicates an out-point frame of the cut-out range, and the processing unit is further configured to:

cut out second image data, in the cut-out range of the in-point frame and the out-point frame, from the first image data recorded on the recording medium, wherein time code values of the second image data match the first time code value and the second time code value; and transfer the second image data.

5. An image processing method, comprising:

transmitting, by a transmission unit, monitoring image data with a time code to an external device, wherein the monitoring image data corresponds to image data recorded on a recording medium;

receiving, by a reception unit, an electronic mark placement command from the external device, wherein the electronic mark placement command includes a time code value indicating a target frame on which an electronic mark is to be placed;

determining, by a processing unit, the target frame is in one of a currently recorded clip or a previously recorded clip based on the time code value:

storing, by the processing unit, the time code value as information associated with an electronic mark placement position on the currently recorded clip, wherein the time code value is stored based on the determination that the target frame is in the currently recorded clip; and adding, by the processing unit, the electronic mark on the target frame indicated by the time code value, wherein the electronic mark is placed based on the determination that the target frame is in the previously recorded clip, wherein the recorded among image data corresponding to the monitoring image data includes the previously recorded clip.

6. An image processing apparatus, comprising:

a reception unit configured to receive, from an external device, monitoring image data with a time code;

a receive buffer configured to store the received monitoring image data;

a control unit configured to reproduce the monitoring image data from the receive buffer;

a setting unit configured to set a target frame in the monitoring image data stored in the receive buffer; and a transmission unit configured to transmit, to the external device, an electronic mark placement command including a specific time code value, wherein the specific time code value indicates the target frame on which an electronic mark is to be placed, and the external device:

determines the target frame is in one of a currently recorded clip or a previously recorded clip, based on the specific time code value, stores the specific time code value, as information associated with an electronic mark placement position on the currently recorded clip, wherein the specific time code value is stored based on the determination that the target frame is in the currently recorded clip, and adds the electronic mark on the target frame, indicated by the specific time code value, based on the determination that the target frame is in the previously recorded clip.

7. The image processing apparatus according to claim 6, wherein the setting unit is further configured to set a specific frame of the reproduced monitoring image data as the target frame based on a frame designation operation by a user.

8. The image processing apparatus according to claim 7, further comprising a reproduction position control unit configured to control a reproduction position of the monitoring image data reproduced from the receive buffer, wherein the reproduction position of the monitoring image data is controlled based on a a specific position on a timeline associated with a time period of the monitoring image data stored in the receive buffer.

9. The image processing apparatus according to claim 6, wherein the transmission unit is further configured to transmit a cut-out and transfer command including a first time code value that indicates an in-point frame of a cut-out range, and a second time code value that indicates an out-point frame of the cut-out range.

10. An image processing method, comprising:

receiving, by a reception unit, monitoring image data with a time code from an external device;

storing the received monitoring image data in a receive buffer;

reproducing, by a control unit, the monitoring image data from the receive buffer;

setting, by a setting unit, a target frame in the monitoring image data stored in the receive buffer; and transmitting, by a transmission unit, an electronic mark placement command to the external device, wherein the electronic mark placement command includes a time code value that indicates the target frame on which an electronic mark is to be placed, and the external device:

determines the target frame is in one of a currently recorded clip or a previously recorded clip, based on the time code value, stores the time code value, as information associated with an electronic mark placement position on the currently recorded clip, wherein the time code value is stored based on the determination that the target frame is in the currently recorded clip, and adds the electronic mark on the target frame, indicated by the time code value, based on the determination that the target frame is in the previously recorded clip.

11. A camera apparatus, comprising:

an image-capturing unit configured to obtain an image-capturing signal;

an image-capturing signal processing unit configured to process the image-capturing signal to obtain specific image data;

a recording unit configured to record, on a recording medium, the specific image data and a time code attached to the specific image data;

a transmission unit configured to transmit, to a remote control apparatus, monitoring image data with the time code,
  wherein the monitoring image data is based on the specific image data obtained by processing the image capturing signal;

a reception unit configured to receive, from the remote control apparatus, an electronic mark placement command that includes a time code value, wherein the time code value indicates a target frame on which an electronic mark is to be placed; and a processing unit configured to:
  determine the target frame is in one of a currently recorded clip or a previously recorded clip, based on the time code value;
  store the time code value as information associated with an electronic mark placement position on the currently recorded clip, wherein the time code value is stored based on the determination that the target frame is in the currently recorded clip; and
  add the electronic mark on the target frame, indicated by the time code value, based on the determination that the target frame is in the previously recorded clip, wherein the specific image data corresponding to the monitoring image data includes the previously recorded clip.

12. A remote control apparatus, comprising:

a reception unit configured to receive, from a camera apparatus, monitoring image data with a time code;

a receive buffer configured to store the received monitoring image data;

a control unit configured to reproduce the monitoring image data from the receive buffer;

a setting unit configured to set a target frame in the monitoring image data stored in the receive buffer; and a transmission unit configured to transmit, to the camera apparatus, an electronic mark placement command including a time code value, wherein
  the time code value indicates the target frame on which an electronic mark is to be placed, and
  the camera apparatus:
    determines the target frame is in one of a currently recorded clip or a previously recorded clip, based on the time code value,
    stores the time code value as information associated with an electronic mark placement position on the currently recorded clip, wherein the time code value is stored based on the determination that the target frame is in the currently recorded clip, and
    adds the electronic mark on the target frame, indicated by the time code value, based on the determination that the target frame is in the previously recorded clip.

13. A camera system, comprising:

a camera apparatus; and a remote control apparatus connected with the camera apparatus via a wireless network, wherein
  the camera apparatus comprises:
    a first reception unit;
    a processing unit;
    an image-capturing unit configured to obtain an image-capturing signal;
    an image-capturing signal processing unit configured to process the image-capturing signal to obtain specific image data;
    a recording unit configured to record, on a recording medium, the specific image data and a time code attached to the specific image data; and
    a first transmission unit configured to transmit, to the remote control apparatus, monitoring image data with the time code, wherein
    the monitoring image data is based on the specific image data, and
  the remote control apparatus comprises:
    a second reception unit configured to receive, from the camera apparatus, the monitoring image data with the time code;
    a receive buffer configured to store the received monitoring image data;
    a control unit configured to reproduce the monitoring image data from the receive buffer;
    an image display unit configured to display an image based on the reproduction of the monitoring image data from the receive buffer;
    a setting unit configured to set a target frame in the monitoring image data stored in the receive buffer; and
    a second transmission unit configured to transmit, to the camera apparatus, an electronic mark placement command including a time code value, wherein the time code value indicates the target frame on which an electronic mark is to be placed,
  the first reception unit of the camera apparatus is configured to receive, from the remote control apparatus, the electronic mark placement command including the time code value, and
  the processing unit of the camera apparatus is configured to:
    determine the target frame is in one of a currently recorded clip or in a previously recorded clip, based on the time code value;
    store the time code value as information associated with an electronic mark placement position on the currently recorded clip, wherein the time code value is stored based on the determination that the target frame is in the currently recorded clip; and
    add the electronic mark on the target frame, indicated by the time code value, based on the determination that the target frame is in the previously recorded clip, wherein the specific image data corresponding to the monitoring image data includes the previously recorded clip.

* * * * *